United States Patent
Rose et al.

(10) Patent No.: US 9,720,860 B2
(45) Date of Patent: Aug. 1, 2017

(54) SYSTEM AND METHOD FOR EFFICIENT PROCESSING OF QUEUED READ COMMANDS IN A MEMORY SYSTEM

(71) Applicant: OCZ Storage Solutions, Inc., San Jose, CA (US)

(72) Inventors: Philip David Rose, Islip (GB); Matthew Stephens, Cockermouth (GB)

(73) Assignee: Toshiba Corporation, Tokyo (JP)

(*) Notice: Subject to any disclaimer, the term of this patent is extended or adjusted under 35 U.S.C. 154(b) by 420 days.

(21) Appl. No.: 14/298,492

(22) Filed: Jun. 6, 2014

(65) Prior Publication Data
US 2015/0356033 A1  Dec. 10, 2015

(51) Int. Cl.
| | |
|---|---|
| *G06F 7/00* | (2006.01) |
| *G06F 9/44* | (2006.01) |
| *G06F 13/16* | (2006.01) |
| *G06F 13/42* | (2006.01) |
| *G06F 12/02* | (2006.01) |

(52) U.S. Cl.
CPC ...... *G06F 13/1642* (2013.01); *G06F 12/0246* (2013.01); *G06F 13/1673* (2013.01); *G06F 13/4221* (2013.01); *G06F 2212/7203* (2013.01)

(58) Field of Classification Search
None
See application file for complete search history.

(56) References Cited

U.S. PATENT DOCUMENTS

| | | |
|---|---|---|
| 2010/0161936 A1 | 6/2010 | Royer et al. |
| 2014/0250272 A1* | 9/2014 | Hall ............ G06F 3/0611 |
| | | 711/118 |

OTHER PUBLICATIONS

"Serial ATA Native Command Queueing, An Exciting New Performance Feature for Serial ATA," A Joint Whitepaper by Intel Corporation and Seagate Technology, Jul. 2003, 12 pages.
Walker, Don. H., "A Comparison of NVMe and AHCI," Jul. 31, 2012, 40 pages.

* cited by examiner

*Primary Examiner* — Cheng-Yuan Tseng
(74) *Attorney, Agent, or Firm* — White & Case LLP

(57) ABSTRACT

A solid state drive (SSD) storage system includes a memory controller, host interface, memory channels and solid state memories as storage elements. The completion status of sub-commands of individual read commands is monitored and used to determine an optimal selection for returning data for individual read commands. The completion of a read command may be dependent on the completion of multiple individual memory accesses at various times. The queueing of multiple read commands which may proceed in parallel or out of order causes interleaving of multiple memory accesses from different commands to individual memories. A system and method is disclosed which enables the selection, firstly of completed read commands, independent of the order they were queued and, secondly, of partially completed read commands which are most likely to complete with the least interruption or delay, for data transfer, which in turn improves the efficiency of the data transfer interface.

23 Claims, 8 Drawing Sheets

Fig 1. Prior Art -
Hard Disk No NCQ

Fig 2. Prior Art -
Hard Disk With NCQ

| 00 | 1 | 1 | 1 | 0 | 1 | 1 | 0 | 0 | 0 | 0 | | 5 | 4 |
|----|---|---|---|---|---|---|---|---|---|---|---|----|---|
| 01 | 1 | 1 | 0 | 1 | 1 | 1 | 0 | 1 | 1 | 0 | | 4 | 2 |
| 02 | 1 | 1 | 1 | 0 | 0 | 1 | 0 | 0 | 0 | 0 | | 8 | 3 |
| 03 | 1 | 1 | 1 | 1 | 1 | 1 | 0 | 0 | 0 | 1 | .... | 5 | 6 |
| 30 | 1 | 1 | 1 | 1 | 1 | 1 | 0 | 0 | 0 | 0 | .... | 5 | 7 |
| 31 | 0 | 0 | 0 | 0 | 0 | 0 | 0 | 0 | 0 | 0 | | 12 | 0 |

Fig 6.

SYSTEM AND METHOD FOR EFFICIENT PROCESSING OF QUEUED READ COMMANDS IN A MEMORY SYSTEM

FIELD OF THE INVENTION

The present invention is generally related to improving the processing of queued read commands in a solid state drive memory system. More particularly, the present invention is directed to techniques for implementing native command queueing in a solid state drive.

BACKGROUND OF THE INVENTION

Mass storage systems have for many years been based on hard disk drives (HDDs) where spinning magnetic discs are accessed using data read/write heads mounted on an actuator arm which is moved in an arc across the discs. Several discs or platters are mounted on common spindle and a read/write head is provided for each disc surface, also on a common arm. To access a particular piece of data, the drive controller may need to move the actuator arm to the correct position on the disc, which may also involve waiting for up to one drive rotation to occur. The discs spin in unison and the heads also move in unison. Thus, while parallel access is possible, the surface of each disc in not independently accessible.

In spite of the limitations of non-independent access, improvements in the efficiency of data access have been made, such that a drive controller can maintain a queue of commands and decide for itself the optimal order in which to place the commands in order to minimize the movement of the actuator arm and the number of disc rotations that occur, and thereby minimize the access time to the data. Such a scheme is described in a joint whitepaper by Intel Corporation and Seagate Technology entitled "Serial ATA Native Command Queueing, An Exciting New Performance Feature For Serial ATA" published in July 2003. Native Command Queueing (NCQ) therefore re-orders the commands and returns the data, not in the order that the commands were originally queued, but in an order that causes the data to be returned more quickly, as the access time for the commands taken as a group is minimized. NCQ was incorporated into the ATA/ATAPI-7 standard in 2003.

FIG. 1. shows a schematic representation of a hard disk in the prior art. The disk platter 100 is segmented into concentric rings called tracks (110,120,130,140) where data may be written and read from. The disk is accessed through the rotation 200 of the platter and an actuator arm 190, with a read/write head at the tip 195. By way of example, data is shown located on tracks, with data sector 150 on track 110, data sector 160 on track 120, data sector 170 on track 130 and data sector 180 on track 140. If data commands to these sectors were issued in this order, the rotation of the platter and positioning of the read/write head would mean that the head would follow the path shown by the dotted line 197.

FIG. 2., shows a hard disk in the prior art with the same placement of data, but where NCQ (Native Command Queueing) is employed where the commands are first queued and then issued in a sequence which reduces the overall time spent moving from one sector to another. In this case, the path 190 taken by the head data shows that sector 150 is first transferred, then sector 170, and then sector 160 before finally sector 180. The path taken (and the time taken to traverse the path) in this case is much shorter than that shown in FIG. 1, and so the data for the sectors may be transferred at a greater overall data rate as the time spent moving from sector to sector is shortened.

In recent years, the use of non-volatile flash memory has become more and more prevalent. One use has been to build emulations of hard disk drives, known as Solid State Drives (SSDs), or as Solid State Disks. To allow SSDs to be used as a direct replacement for HDDs, they must offer the same interface and adhere to the same standards as HDDs which include Serial Advanced Technology Attachment (SATA) and ATA/ATAPI, which includes support for NCQ.

A typical SSD comprises a memory controller and a number of memory devices. The memory controller provides an interface to the host system on one side and multiple interfaces to memory devices on the other. The memory device interfaces can operate independently in parallel and are termed 'channels.' On each memory channel there may be attached multiple devices arranged on a parallel data bus which are termed 'banks.' While only one data transfer, read or write, may be active at any one time, memory operations which do not require data transfer may proceed in parallel. Therefore, one memory bank may be executing an erase operation, which does not require any data transfer, while another bank executes a program operation which only requires a short data transfer period compared to a longer programming period, while another bank executes a read operation during the erase and programming periods of the other banks.

In order to provide high speed data transfer, the controller will typically arrange that a single data access request from the host will be satisfied by multiple data accesses to multiple banks on multiple channels. This is similar to the concept of data striping used in RAID 0 systems, where a data transfer is split across multiple storage devices, allowing each storage device to transfer data in parallel, thereby effectively multiplying the data transfer rate by the number of storage devices used in parallel.

FIG. 3. shows a simplified schematic of a basic SSD where a flash memory controller 300 accesses a number of flash memory devices, 320-323, via single data channel 325. At any one time, only a single data transfer may take place between the controller and a memory device, 326, while in parallel, any number of operations may take place within the memory devices which do not involve data transfer, 327a, 327b and 327c.

Having only a single data transfer active at any one time means that the I/O performance of such an SSD is severely restricted, certainly not enough to drive a high speed drive interface standard, such as SATA or SAS, to capacity. In order to improve the efficiency and data transfer rates, it is more common to drive multiple data channels in parallel, as shown in FIG. 3B. Here, the flash memory controller 300 connects to memory devices 320-323, 330-333, 340-343 and 350-353. Although only 4 separate channels are shown here, controllers with 8, 16 and 32 separate parallel flash channels have been implemented. Operating in much the same way as hard disks in a RAID configuration, independent simultaneous data transfers to 4, 8, 16 or 32 flash devices are possible, thereby increasing data transfer throughputs over what can be achieved to a single device on a single flash channel.

Unlike a hard disk drive, there is no particular benefit in locating data in different areas of memory (different memory devices) as the access time to any device is the same as any other. However, it may be beneficial, for example when updating or re-writing data, to perform an erase operation on a different device while transferring data to/from a device as erasing on one device and data transfer to/from another may be performed in parallel, as the former does not involve data transfer on the data channel.

Although NCQ was designed primarily to cope with the access latencies of HDDs, there are latencies associated with data access to SSDs, but these are as the result of using solid state memory devices instead of rotating magnetic discs. Therefore, systems and methods which may have been developed to optimize data access to HDDs are no longer relevant to optimize data access to SSDs.

There are numerous difficulties in employing an NCQ implementation in an SSD. Consider first a HDD implementation. When multiple commands are presented in a queue, in an NCQ implementation with an HDD, an algorithm may attempt to order the commands based on the starting logical block address of each command. A fixed mapping exists between the LBA and the platter, and physical location on the platter used for that data. Based on the current position of the actuator arm and the current rotational position, it can be calculated to a fair degree of certainty how long the actuator arm may take to move to a different position. From the starting position, the data transfer speed may also be calculated and also the ending position of the read/write head after the transfer. Therefore, the complete time taken to execute several commands in sequence may also be determined with a fair degree of certainty.

By contrast, in an SSD, there may be a mapping from an LBA to a physical position within a memory device, but in an SSD memory controller with multiple memory channels, the access time to a given memory bank on a given memory channel is largely independent of the bank or channel position, as electrically all the channels and banks are equivalent. Rather, the access time to a bank on a given channel is more likely to be affected by other operations already proceeding on other banks on that memory channel, and the data either already present in the memory or being presented for writing.

While some memory operations, such as a read data operation, may be fairly consistent and determinate in terms of elapsed time, other operations such as erase and programming may be quite variable in elapsed time. These variations may be due to the previous contents of the memory locations concerned when erasure (which is the first stage of writing data) is performed, or may depend on the data itself when programming (which is the second stage of writing data). This is due to the fact that erase requires the removal of charge from the memory cells and programming the adding of charge to the memory cells where both operations may be conducted in a series of discrete steps, and the number of steps will depend on the initial charge state of the cell in the case of erasure or final charge state in the case of programming.

When multiple memory operations proceed in parallel to multiple banks on the same channel, the processing of an operation on one bank can interfere with the processing and timing of another operation on a different bank. Also, given that a single data operation from the host may be split into several sub-operations on different channels, the processing and timing of these sub-operations on each channel may vary according to other sub-operations proceeding or queued in parallel on the same channel Therefore, it becomes very difficult to model with any degree of certainty and accuracy the interactions of many sub-operations proceeding on multiple channels and banks, with the result that it might seem to be impossible to achieve any performance improvements by using NCQ in an SSD. The most efficient queueing and submission of data commands is the prime objective of NCQ when using an HDD, as once the command is submitted the writing or reading of data is subject to a determinate and predictable process to the point of completion. But with an SSD the command may be split into multiple sub-commands, each possibly directed to a different device or die within a device, which may be subject to different unpredictable delays and variations, with the result that the completion of each sub command may occur in a apparently random and unpredictable manner.

In recognition that SSDs behave much differently than HDDs and that using existing hardware interfaces and protocols designed originally for HDDs, such as SATA and ATA/ATAPI does not exploit the new characteristics of SSDs, a new protocol called NVM Express (NVM standing for Non Volatile Memory) was developed which is based on the PCI (Peripheral Component Interconnect) Express standard, commonly referred to as NVMe and PCIe respectively. The NVMe protocol specification defines provision for up to 65,535 separate queues each with up to 64K queue entries, which can exploit the parallelism that exists in SSDs There is therefore a need for systems and methods which can optimize the data access to solid state memory devices in order to reduce the access latencies of a set of queued commands, particularly in NCQ or NVMe queueing implementations.

SUMMARY OF THE INVENTION

A solid state drive (SSD) memory storage system optimizes data access to solid state memory devices to reduce the access latencies of a set of queued commands. The memory controller of the SSD receives read commands from a host and returns the data, not in the order that the commands were originally queued, but in an order that causes the data to be returned more quickly, as the access time for the commands taken as a group is minimized.

In an embodiment of the present invention, the memory controller monitors a queue of commands issued by a host system, where each read command has a set of read sub-commands. Individual commands are queued in-order in a queue and a selection algorithm determines an optimal order for returning read data. For the case of read commands, an individual sub-command may include reading a portion of memory and returning data. The completion status of each sub-command is monitored and used to optimally select the next read command's data to be returned to the host system. By monitoring the completion status of each sub-command comprising the command issued by the host, a system and method optimally selects the next read command's data to be returned to the host, which may consist of several pieces of sub-data which are still pending and therefore the complete data may be incomplete at the moment the command is selected for return of data to the host.

An embodiment of a system and method is described which enables the selection, firstly of completed read commands, independent of the order they were queued and, secondly, of partially completed read commands which are most likely to complete with the least interruption or delay, for data transfer, which in turn improves the efficiency of the data transfer interface.

An embodiment of the present invention provides a method for the efficient processing of non-volatile memory read commands which are queued in an NCQ or NVMe system by monitoring to completion each of the component sub-commands that comprise the read command received from the host system. The selection algorithm that selects the next read command's data to be returned to the host may be selected to achieve various objectives, including improving the bus utilization between a non-volatile memory device controller and a host system when returning data from multiple queued memory read commands in an NCQ or NVMe system.

BRIEF DESCRIPTION OF THE DRAWINGS

FIG. 6 is a table illustrating aspects of a method of selecting a read command that is partially completed in accordance with an embodiment of the present invention.

DETAILED DESCRIPTION OF EMBODIMENTS OF THE INVENTION

Figure 1:
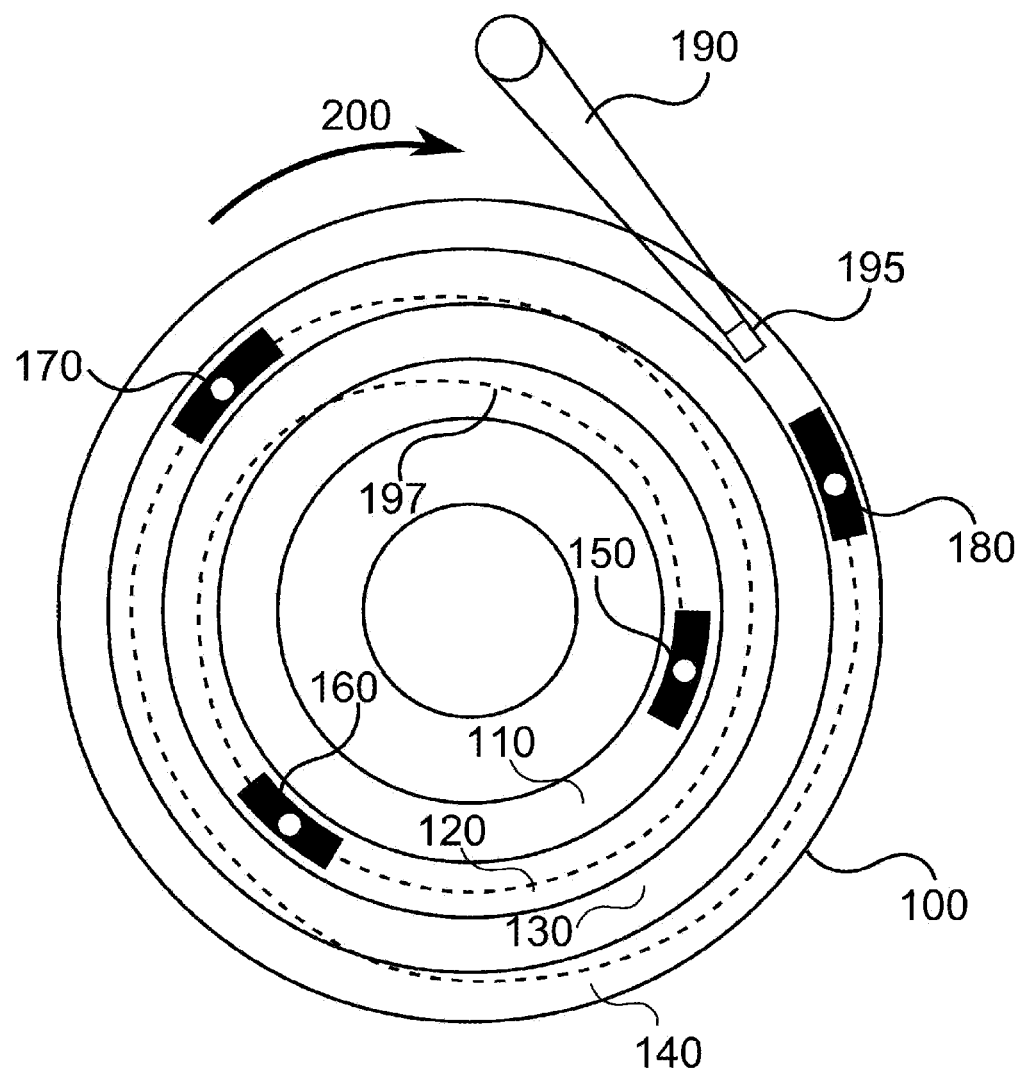
FIG. 1 illustrates a conventional HDD access system without any NCQ in operation.
Figure 2:
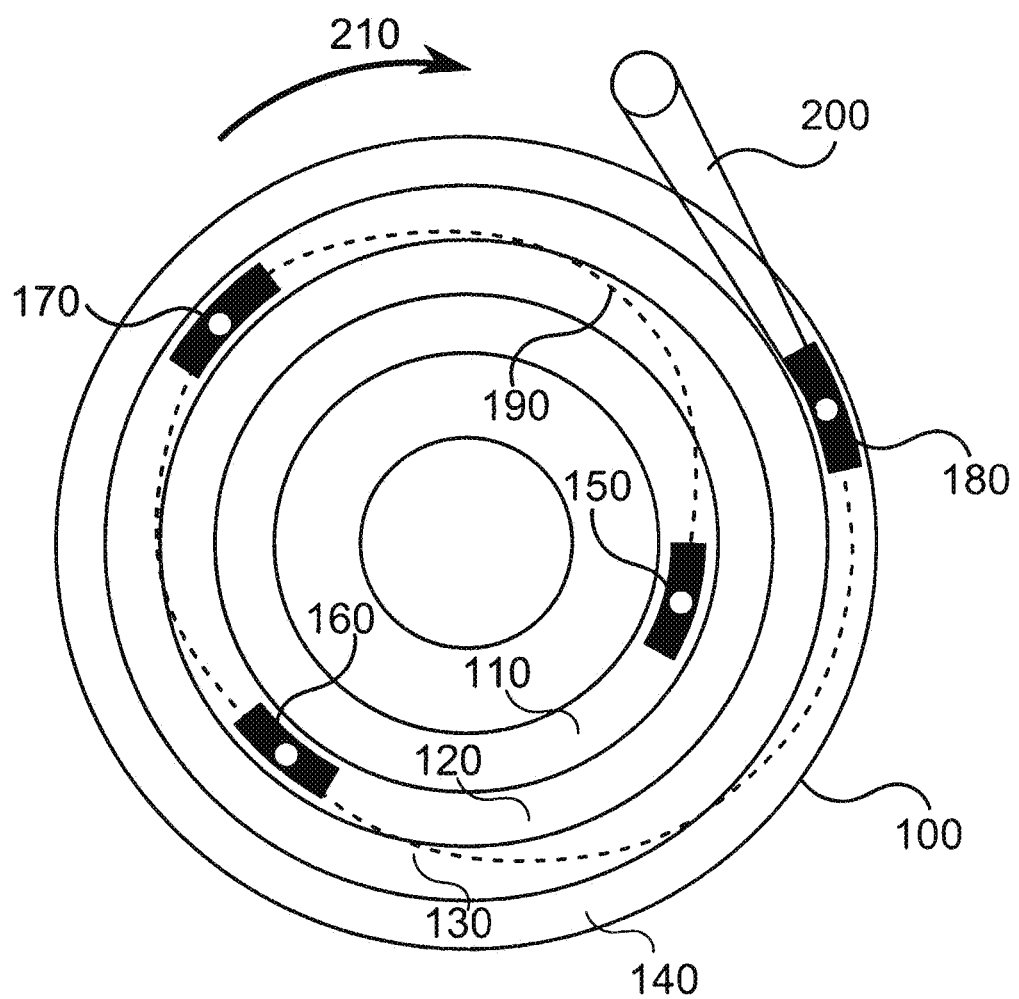
FIG. 2 illustrates a conventional HDD access system with NCQ in operation.
Figure 3:
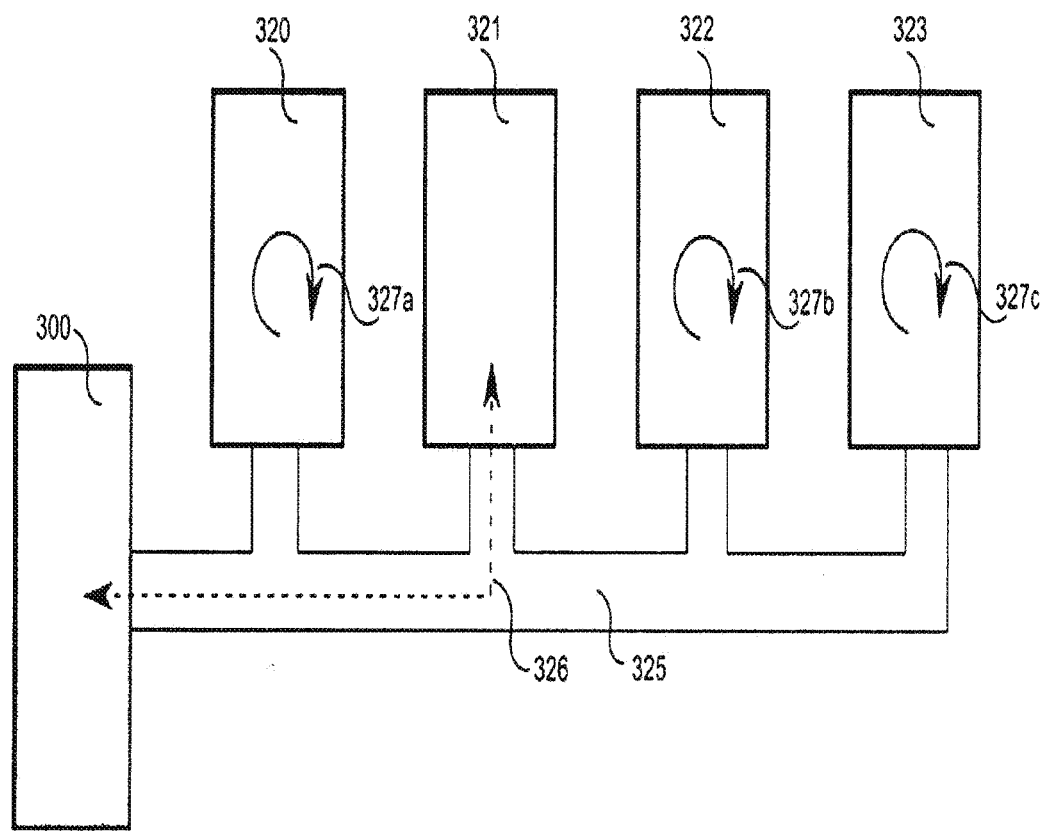
FIG. 3 illustrates a conventional SSD access system without any NCQ or NVMe queueing in operation.
Figure 3B:
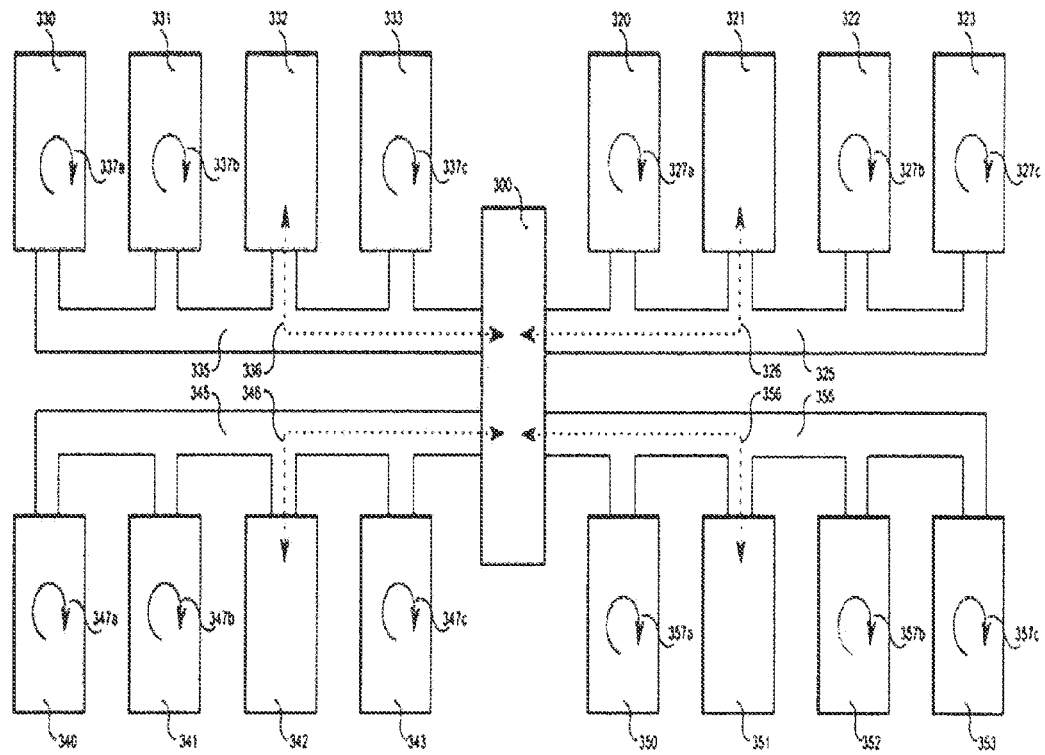
FIG. 3B illustrates a conventional SSD access system with multiple data channels.
Figure 4:
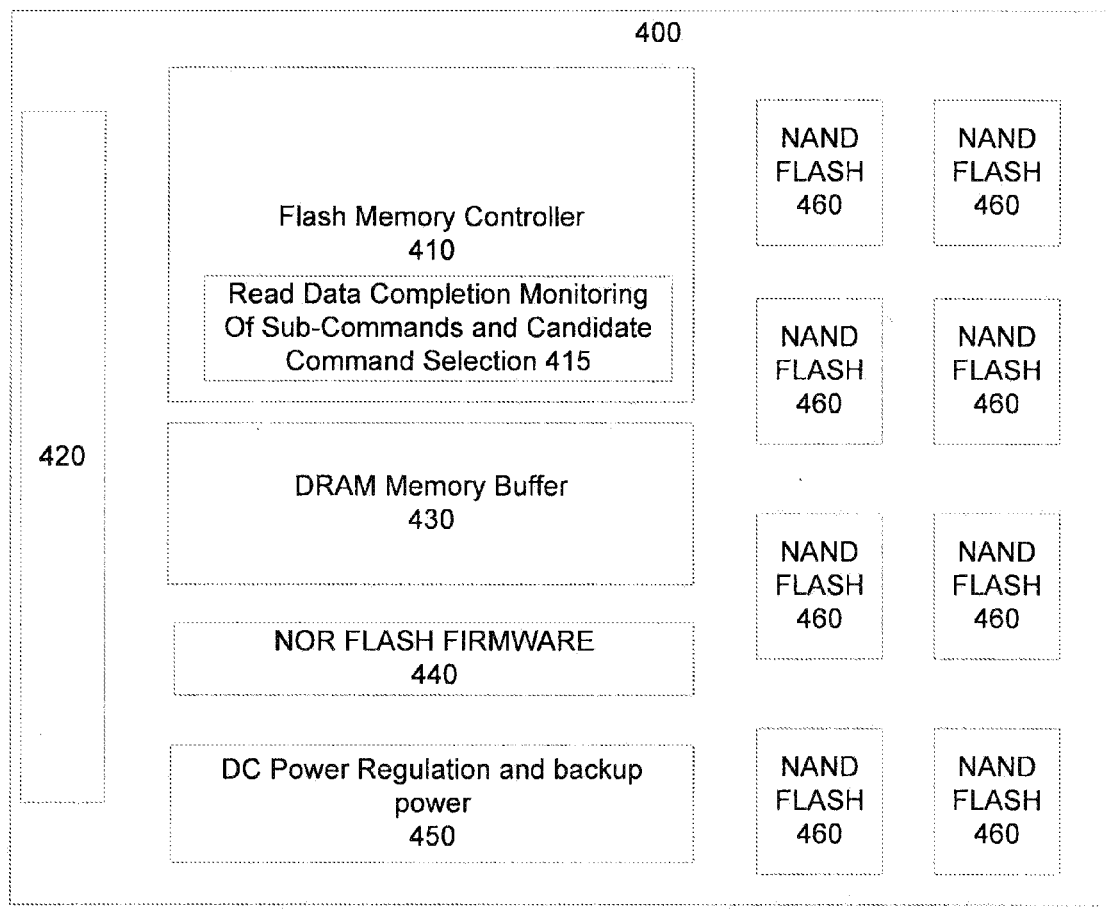
FIG. 4 illustrates SSD access system in accordance with an embodiment of the present invention.

FIG. 4 shows a block diagram of a solid state drive (SSD) 400 and its major components in accordance with an embodiment of the present invention. A memory controller 410 provides the link between the storage or expansion bus interface 420 (which may be SATA, SCSI, SAS, PCIe or similar) and non-volatile solid state memory devices themselves, 460. The solid state memory devices 460 may, for example, be flash memory devices. Memory channels are provided for the memory controller 410 to access the memory devices 460, which may be organized into memory banks. The memory controller may be implemented as firmware including hardware and software. For example, it may include a processor, such as ASIC, a memory, and other hardware.

The number of solid state memory devices 460 may vary according to the storage capacity of the individual devices and the SSD as a whole, but would typically be a power of 2 such as 4, 8, 16, 32 and so on. The memory controller 460 may comprise a single semiconductor device with on-chip ROM for firmware storage and RAM for working data structures and buffers, but there may also be provided external DRAM 430 for additional space for large data translation tables and buffers and external NOR flash 440 for upgradeable firmware storage. To provide the various voltages required by the flash memory controller and external memories, there will be DC power regulation circuitry 450 which may also include a provision for backup power using large capacitors in order to safely manage the shutdown of the SSD in the event of sudden power removal or failure.

In a block-based storage system composed of multiple memory devices as storage elements, the completion of a read command may be dependent on the completion of multiple individual memory accesses at various times for the sub-commands. The queueing of multiple read commands, which may proceed in parallel or out of order, causes interleaving of multiple memory accesses from different commands to individual memories.

On data read commands, the individual flash devices 460 will return a portion of the data buffer to be returned to the host, the timing of which can be very variable and dependent on many factors. To begin with, the issuing of the read command to the device may have to wait in a queue for previous commands to complete on the flash channel, where the latency of individual commands may, in many cases, vary by a factor of 10, particularly for write commands. If erase commands are required to service queued commands, this also adds a great latency, although these are example of commands that may allow other commands to overlap on the flash channel as an erase may proceed internal to a flash device without occupying time on the flash channel Beyond the queueing latency, the actual read command latency can also vary, although this may only be a slight effect when compared to other latencies and variations.

Incoming data commands from a host system (not shown) are received via the bus interface 420 and placed in a command queue in order. An individual read command may have a set of memory block accesses corresponding to different sub-commands. The corresponding data may be returned at different times to a buffer. The buffer has buffer portions that may, for example, correspond to a set of consecutive data blocks. As an illustrative example, a buffer portion may have a data block size of 4 KB, although other data block sizes may be supported. Thus, the buffer for an individual read command has data returned to individual buffer portions over time until all of the data has been returned for that particular command.

The buffers of the SSD temporarily stores data for completed subcommands before it is returned to the host. At any one given time, only a single read command's data transfer may proceed on the bus interface. The memory controller includes a module 415 to monitor the completion status of individual read sub-commands and select a candidate outstanding command to return its data to the host.

In order to track the completion of the portions of data returned by the sub-commands, in one embodiment a bitmap may be used to indicate completion of each individual memory block access that is required to fulfill a command. In the case of a SATA host interface, there may up to 32 outstanding commands. In the case of a PCI Express host interface, there may be up to 65,535 separate queues each with up to 64K queued commands. An individual command may have a set of individual memory block accesses required to fulfill the commands, corresponding to completion of a set of sub-commands. Commands that have all block reads fulfilled may be passed to a completion queue, thereby allowing the data to be returned in the order the commands complete, not in the order they were received. In one embodiment if no commands have been completely fulfilled, an algorithm is used to select the command that is most likely to complete in the shortest time and to start transferring the data returned so far.

In one embodiment, a table having a set of bits (e.g., 0 or 1) may be constructed to represent the state of completion of the commands. Individual bit entries may be used to indicate the completion status of buffer portions of the buffer, which corresponds to completion of memory block accesses required to complete the read command. Additional bit entries may be included in some embodiments to summarize other information, such as the number of buffers outstanding and summary information to compare the status of different commands.

Figure 5:
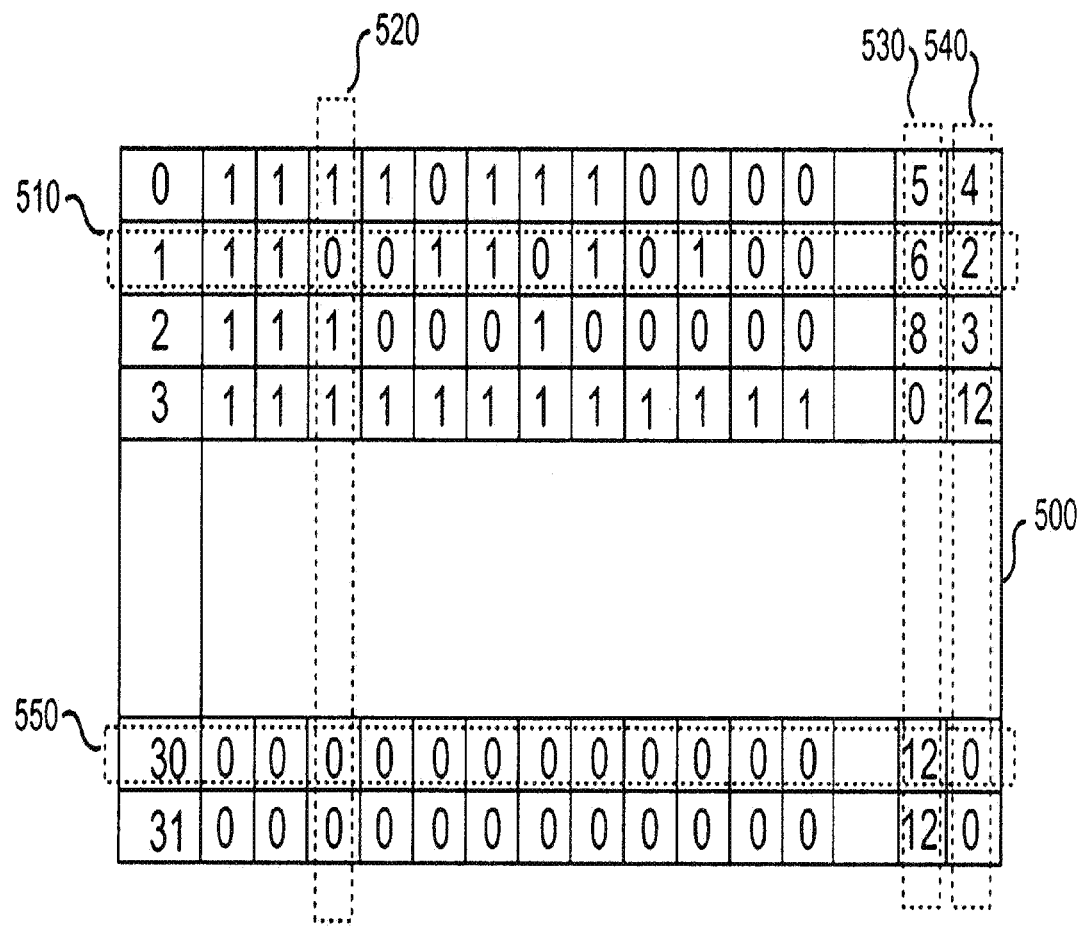
FIG. 5 is a table illustrating aspects of a method of tracking completion of portions of data returned by sub-commands in accordance with an embodiment of the present invention.

FIG. 5 shows an example of such a table 500, which has a line 510 corresponding to each of the currently queued commands (up to 32 in SATA NCQ or 65535 in NVMe queueing). Thus, in the illustrated example there are command lines tagged 0, 1, 2, 3 . . . 31 in a SATA implementation corresponding to up to the 32 SATA commands. However, it will be understood that the number of lines and columns is an implementation detail that can be varied based upon the interface standard.

FIG. 5 shows a sequence of columns, including column 520, each representing a portion of the data read buffer, containing an indicator (e.g. 0 or 1) to show if the portion of the buffer has been read or is still outstanding. Thus, the table 500 has bits indicating whether blocks of data have been read or are still outstanding. For example, a "1" may indicate that data has been returned and a "0" indicate that data is still outstanding.

The table 500 may also have extra columns, storing information such as the number of buffers outstanding 530. Thus in this example, column 530 illustrates that for command line 0 there are 5 outstanding blocks of data which are outstanding; six outstanding blocks of data for command line 1, eight for command line 2, and 0 for command line 3.

The table 500 may also include a column 540 summarizing the number of consecutive buffer portions from the start of the buffer that have been returned from the flash devices. Thus, in this example, command line 0 has 4 consecutive buffer portions returned and command line 1 has 2 consecutive buffer lines returned. When a command is first issued, the values in the columns in the corresponding row will be reset, as illustrated in row 550.

Consider the example of a SATA host interface. With a SATA host interface, while there may be 32 NCQ'd read commands outstanding and waiting to be serviced, only a single read command's data transfer may proceed on the host interface at any given time. Therefore, periodically, when the firmware has processed a previous read command and actioned the return of its data to the host, it must select the next candidate outstanding command to return its data to the host. Clearly, if a command has all the columns for its portions indicating that the complete data has been returned from flash (or, equivalently, has 0 in its 'number of outstanding buffer portions' column), as in row 560 in FIG. 5, then that command's data buffer should be returned next However, a problem exists in making this decision if there are no candidate commands with zero outstanding buffer portions. Thus, a rule is required to make a decision when there are no candidate commands with zero outstanding buffer portions. In theory, one approach would be to select the command with the least number of outstanding buffers. However, in one embodiment this problem is solved by choosing the command with the most number of outstanding buffer portions, as counted from the beginning of the buffer. The choice in this case may not be the command with the least number of outstanding buffers, but it results in more efficient use of the interface bus to the host. This is because it will result in the longest possible uninterrupted data transfer to the host before the transfer must be paused to wait for the next buffer portion to become available (once a given command's data transfer has been started, it must be continued to completion, although it may be paused to wait for data to become available). At the time the selection is made, there is no way to predict with any precision whether any particular outstanding buffer portion of a command will be filled and available for return to the host. Therefore, it is better to occupy the host interface bus for the longest guaranteed time, rather than transfer a smaller set of buffer portions and have to pause the transfer for an indeterminate period waiting for the next consecutive buffer portion to become available.

The example shown in FIG. 6 illustrates an embodiment in which a table 600 is used when no candidate campaigns have zero outstanding buffer portions. This shows a table 600 of the kind previously described, but where there are no outstanding commands that have all of their data buffer portions completely filled from flash.

In command 610 with tag 01, there are 4 outstanding data buffer portions and 2 consecutive buffer portions from the start. In command 620 with tag 03, there are 5 outstanding data buffer portions and 6 consecutive buffer portions from the start. Command 630 with tag 30 also has 5 outstanding data buffer portions but 7 consecutive buffer portions from the start.

In the example of table 600, if the choice of which command to select for transferring its data buffer back to the host was made on the basis of choosing the command which had the greatest portion of the data buffer available, command 610 would be chosen as there are only 4 outstanding data buffer portions remaining compared to 5 or more data buffer portions in the other outstanding commands.

However, note that command 610 has only 2 consecutive buffer portions available before the transfer must be paused until the 3rd buffer portion becomes available, which results in a risk that the bus transfer to the host could be halted for a considerable unknown time. In contrast, by choosing command 630 instead, a much longer bus transfer of 7 data portions can be guaranteed. A longer data transfer period also increases the likelihood that the 8th portion will arrive before its transfer is required, thereby ensuring a seamless transfer with no pause.

In one embodiment, the data buffer portions may consist of a flash page, or a sub-division of a flash page known as a slice. A flash page may typically consist of 4K bytes, but data transfers with the SATA protocol take place in units of 512 byte blocks as this derives from the size of a data block or sector on an HDD. The protocol imposes a limit of a data buffer for a single read command transfer of 64K blocks.

Figure 7:
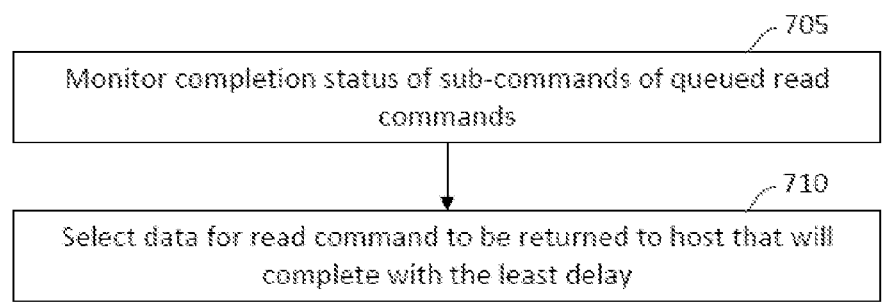
FIGS. 7 and 8 are flowcharts illustrating methods of selecting read commands in accordance with embodiment of the present invention.
Figure 8:
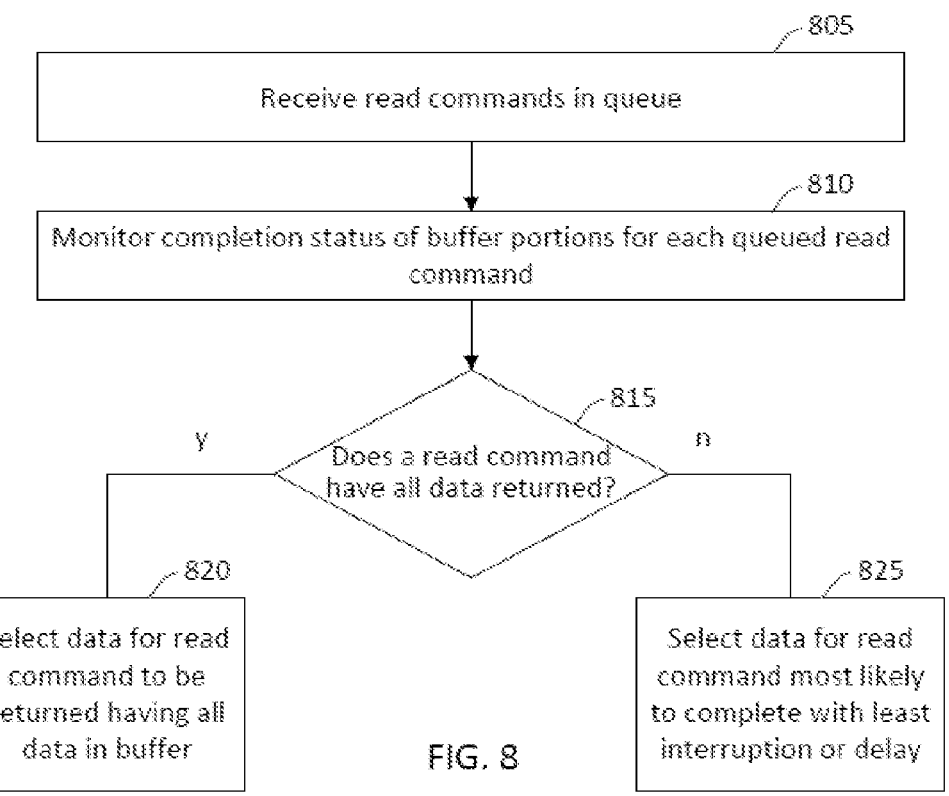

FIGS. 7 and 8 illustrate flowcharts for methods of selecting read commands by firmware in a memory controller in an SSD. FIG. 7 is a flowchart in accordance with an embodiment of the present invention. The completion status of sub-commands of queued read commands is monitored in block 705. A read command is selected to be returned to the host system that will complete with the least delay. FIG. 8 illustrates receiving read commands in a queue in block 805. The completion status of buffer portions of each queued read command is monitored in block 810. A determination is performed in block 815 whether any of the read commands have all of the data returned. If the all of the buffer portions have been returned for a read command, it may be selected as a candidate command and the data returned to the host system in block 820. If data has only been partially returned for all of the read commands, then data is returned in block 825 for the read command most likely to complete with least interruption or delay, as illustrated in greater detail in FIGS. 5 and 6.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

The invention claimed is:

1. A solid state drive memory storage system including at least one of Native Command Queueing (NCQ) and Non Volatile Memory Express (NVMe) queueing, comprising:
a memory controller having an interface to receive a plurality of read commands from a host system, each read command of the plurality of read commands associated with a plurality of sub-commands for accessing a corresponding plurality of memory blocks; and
memory channels to access a plurality of solid state memory devices,
wherein the memory controller identifies a next read command from the plurality of read commands that will complete with the least delay or interruption by monitoring completion status of the plurality of sub-commands of the plurality of read commands, and returns data corresponding to the next read command to the host system.

2. The system of claim 1, wherein in response to determining that one of the plurality of read commands has all associated sub-commands completed, identifies the one of the plurality of read commands as the next read command.

3. The system of claim 1, wherein in response to determining that none of the plurality of read commands have all associated sub-commands completed, identifies as the next read command a read command having partially completed sub-commands that is most likely to complete with the least interruption or delay.

4. The system of claim 1, further comprising data buffer portions for sub-commands, wherein the memory controller monitors, for each of the plurality of read commands, a data return status of the data read buffer portions.

5. The system of claim 4, wherein the memory controller monitors a table representing the data return status of the data read buffer portions.

6. The system of claim 5, wherein the table includes a column indicating a number of data buffer portions outstanding and a number of consecutive data buffer portions fulfilled.

7. The system of claim 1, wherein a completion of an individual read command is dependent on the completion of the associated plurality of sub-commands at various times.

8. The system of claim 1, wherein processing of the plurality of read commands proceeds in parallel or out of order, causing interleaving of multiple memory accesses from different read commands to individual memories.

9. The system of claim 1, wherein the memory controller supports a Serial Advanced Technology Attachment (SATA) interface having up to 32 queued commands.

10. The system of claim 1, wherein the memory controller supports a PCI Express (PCIe) interface having up to 65,535 queues each with up to 64K queued commands.

11. A solid state drive (SSD) memory storage system including at least one of Native Command Queueing (NCQ) and Non Volatile Memory Express (NVMe) queueing, comprising:
a set of non-volatile flash memory devices organized into memory banks;
an interface to a host system;
a memory interface to the set of non-volatile flash memory devices;
a queue for receiving a plurality of read commands from the host system, wherein the plurality of read commands are queued in order and each read command of the plurality of read commands is associated with a plurality of sub-commands for accessing a corresponding plurality of memory blocks;
a buffer having buffer portions for data returned from the set of non-volatile flash memory devices by the plurality of sub-commands associated with each of the plurality of read commands; and
a memory controller identifying a next read command from the plurality of read commands that will complete with the least delay or interruption by monitoring completion status of the plurality of sub-commands that have returned data to the buffer for the plurality of read commands, and returning data corresponding to the next read command to the host system.

12. The system of claim 11, wherein the memory controller identifies the next read command as one of the plurality of read commands having all associated sub-commands completed.

13. The system of claim 12, wherein the memory controller, in response to determining that none of the plurality of read commands have all associated plurality of sub-commands completed, identifies the next read command as a read command having sub-commands completion status that is likely to complete with the least interruption or delay.

14. The system of claim 11, wherein the memory controller monitors a table representing the completion status of sub-commands associated with the plurality of read commands, with each row of the table corresponding to one of the plurality of read commands and a set of columns representing a portion of the buffer.

15. The system of claim 14, wherein the table includes a column indicating a number of buffer portions outstanding and the number of consecutive buffer portions fulfilled.

16. A method for the efficient processing of non-volatile memory read commands which are queued in a Native Command Queueing (NCQ) or Non Volatile Memory Express (NVMe) queueing system, comprising:
queueing a plurality of read commands received from a host system for processing by a set of non-volatile memory devices organized into memory banks, each read command of the plurality of read commands associated with a plurality of sub-commands for accessing a corresponding plurality of memory blocks;
identifying a next read command from the plurality of read commands that will complete with the least delay or interruption by monitoring completion status of sub-commands for the plurality of read commands; and
returning data corresponding to the next read command to the host system, independent of the order the plurality of read commands were queued.

17. The method of claim 16, wherein the next read command is one of the plurality of read commands having all associated sub-commands completed.

18. The method of claim 17, wherein, in response to determining that none of the plurality of read commands have all associated sub-commands completed, identifying the next read command as a read command having sub-commands completion status that is most likely to complete with the least interruption or delay.

19. The method of claim 16, further comprising storing data corresponding to sub-commands in respective data buffer portions, wherein the memory controller monitors, for each of the plurality of read commands, a status of each of the data buffer portions.

20. A method for the efficient processing of non-volatile memory read commands which are queued with Native Command Queueing (NCQ) or Non Volatile Memory Express (NVMe) queueing, comprising:

generating a table representing a completion status for a plurality of sub-commands associated with each of a plurality of read commands received from a host system;

identifying a next read command from the plurality of read commands that will complete with the least delay or interruption by monitoring completed sub-commands for the plurality of read commands; and returning data corresponding to the next read command to the host system, independent of the order the plurality of read commands were received.

21. The method of claim 20, wherein the table includes a set of rows representing the plurality of read commands and columns representing completed sub-commands associated with each of the plurality of read commands.

22. The method of claim 21, wherein the table includes a column indicating a number of sub-commands yet to be completed.

23. The method of claim 22, wherein the table includes a column indicating a number of consecutive sub-commands that have been completed.

* * * * *